United States Patent
Le Quere

(10) Patent No.: US 10,711,933 B2
(45) Date of Patent: Jul. 14, 2020

(54) CONNECTION DEVICE AND METHOD FOR CHAMFERED TUBE

(71) Applicant: PARKER HANNIFIN MANUFACTURING FRANCE SAS, Annemasse (FR)

(72) Inventor: Philippe Le Quere, Betton (FR)

(73) Assignee: PARKER HANNIFIN MANUFACTURING FRANCE SAS, Annemasse (FR)

(*) Notice: Subject to any disclaimer, the term of this patent is extended or adjusted under 35 U.S.C. 154(b) by 420 days.

(21) Appl. No.: 15/511,921

(22) PCT Filed: Sep. 15, 2015

(86) PCT No.: PCT/EP2015/071135
§ 371 (c)(1),
(2) Date: Mar. 16, 2017

(87) PCT Pub. No.: WO2016/041989
PCT Pub. Date: Mar. 24, 2016

(65) Prior Publication Data
US 2017/0191593 A1    Jul. 6, 2017

(30) Foreign Application Priority Data

Sep. 17, 2014  (FR) .................................... 14 58791
Dec. 8, 2014   (FR) .................................... 14 62024

(51) Int. Cl.
*F16L 37/092* (2006.01)
*F16L 37/091* (2006.01)

(52) U.S. Cl.
CPC ......... *F16L 37/0925* (2013.01); *F16L 37/091* (2013.01); *F16L 37/0915* (2016.05); *F16L 37/0926* (2019.08); *F16L 37/0927* (2019.08)

(58) Field of Classification Search
CPC . F16L 37/0915; F16L 37/0925; F16L 37/091; F16L 37/0982
(Continued)

(56) References Cited

U.S. PATENT DOCUMENTS 4,407,526 A * 10/1983 Cicenas .............. F16L 37/0925
                                                        285/105
4,660,803 A *  4/1987 Johnston ............. F16L 37/0985
                                                        137/533.17
(Continued)

FOREIGN PATENT DOCUMENTS

DE    102010008926 A1 *  8/2011  .......... F16L 37/0915
EP    0 349 344 A2       1/1990
(Continued)

OTHER PUBLICATIONS

International Search Report and Written Opinion for corresponding Patent Application No. PCT/EP2015/071135 dated Dec. 10, 2015.

*Primary Examiner* — David Bochna
(74) *Attorney, Agent, or Firm* — Renner, Otto, Boisselle & Sklar, LLP

(57) ABSTRACT

A coupling device for a tube having an end portion provided with an outer chamfer, and an associated method. The coupling device includes a tubular body provided internally with an annular sealing element and with an attachment member for retaining the end portion of the tube in leak-tight manner in the body. The device further includes at least one retractable abutment arranged so as to oppose insertion into the body of a tube end portion that is not chamfered but allow insertion of a tube that is chamfered, the chamfer of the tube end portion forming a cam for causing the abutment to retract while the tube is being inserted into the body.

18 Claims, 4 Drawing Sheets

(58) Field of Classification Search
USPC .............................. 285/307, 308, 322, 323
See application file for complete search history.

(56) References Cited

U.S. PATENT DOCUMENTS

| | | | | |
|---|---|---|---|---|
| 4,993,755 | A * | 2/1991 | Johnston | F16L 37/133 285/315 |
| 5,102,170 | A * | 4/1992 | Inoue | F16L 37/0925 285/307 |
| 6,964,436 | B2 * | 11/2005 | Le Quere | F16L 37/091 285/307 |
| 7,264,281 | B2 * | 9/2007 | Le Quere | F16L 37/088 285/308 |
| 8,025,315 | B2 * | 9/2011 | Schreckenberg | F16L 37/091 285/248 |
| 8,528,942 | B2 * | 9/2013 | Giordano | F16L 37/091 285/242 |
| 2003/0234537 | A1 * | 12/2003 | Malone | F16L 37/0925 285/308 |
| 2005/0035597 | A1 * | 2/2005 | Bamberger | F16L 37/091 285/340 |
| 2006/0108801 | A1 | 5/2006 | Grosch | |

FOREIGN PATENT DOCUMENTS

| | | |
|---|---|---|
| FR | 1 455 850 A | 5/1966 |
| FR | 2 923 888 A1 | 5/2009 |
| FR | 2 941 027 A1 | 7/2010 |
| WO | WO-2016041603 A1 * | 3/2016 .......... F16L 37/0925 |

* cited by examiner

CONNECTION DEVICE AND METHOD FOR CHAMFERED TUBE

The present invention relates to fluid transport circuits such as a temperature regulation circuit. The invention provides more particularly a coupling device and method for a chamfered tube.

BACKGROUND

A fluid transport circuit generally comprises tubes that are connected to one another by coupling devices to which end portions of the tubes are coupled.

A coupling device comprises a tubular body provided internally with an annular sealing element and with an attachment member for retaining the end portion of the tube inside the body in leaktight manner. The body has a central tubular appendix on which the tube end portion is to be engaged, the sealing element being mounted on said appendix so as to be compressed between an outside surface of the appendix and an inside surface of the tube end portion. Such mounting serves to prevent fluid coming into contact with the tube ends, which could lead to a laminated tube becoming delaminated.

During installation, the tubes need to be cut to the correct lengths. On an installation site, such cutting is performed by using a scissors-type pipe cutter. Cutting in that way leads to the end portion of the tube being flattened so that it retains a certain amount of ovalization after being cut. Such ovalization gives rise at the terminal face of the pipe end to a sharp angle that might damage the sealing element. In addition, it makes it difficult to obtain continuous contact between the sealing element and the end portion of the tube. It is therefore necessary to return the tube end portion to a circular section prior to coupling it. To do that, a shaper tool is inserted into the end of the tube, which tool also makes an inner chamfer that facilitates inserting the appendix of the body into the tube end portion. There exist shaper tools that also make an outer chamfer in addition to the inner chamfer.

However, it can happen that the operator performing installation forgets to shape one of the end portions prior to coupling it. The risk of leakage is then very great, either immediately on pressurizing the circuit, or else subsequently.

SUMMARY OF THE INVENTION

An object of the invention is to provide means making it possible to limit the risk of a tube being coupled while it is ovalized, since that can lead to damage to the sealing element and to a risk of leakage.

To this end, the invention provides a coupling device for a tube having an end portion provided with an outer chamfer. The device comprises a tubular body provided internally with an annular sealing element and with an attachment member for retaining the end portion of the tube in leaktight manner in the body. The device includes at least one retractable abutment arranged so as to oppose insertion into the body of a tube end portion that is not chamfered and so that the chamfer of a tube end portion that is chamfered forms a cam for causing the abutment to retract while it is being inserted into the body.

The invention thus requires shaper tools to be used that make an outer chamfer as well as an inner chamfer. If the tube end portion has been shaped, its oval shape has been corrected and it presents an outer chamfer. When the tube end portion is inserted into the device, the outer chamfer acts as a cam serving to cause the abutment to retract so as to release the passage for the tube end portion and make coupling possible. If the tube end portion does not have an outer chamfer, then it is certain that it has not been shaped. Since it does not have an outer chamfer, it comes into abutment against the abutment, so the abutment does not retract and it prevents coupling. The abutment thus constitutes a fail-safe member that serves to enable the operator to understand that the end of the tube has not been shaped.

The invention also provides a method of coupling a tube to a coupling device, the method comprising the steps of:
  arranging a retractable abutment on the device so as to allow a tube end portion to be inserted only if it has an outer chamfer;
  cutting the tube to length;
  shaping a tube end portion so as to give it a circular section, where necessary, and so as to form thereon at least one outer chamfer; and
  inserting the tube end portion into the coupling device.

Other characteristics and advantages of the invention appear on reading the following description of particular, non-limiting embodiments of the invention.

BRIEF DESCRIPTION OF THE DRAWINGS

Reference is made to the accompanying drawings, in which.

DETAILED DESCRIPTION

With reference to the figures, the coupling device of the invention is for coupling tubes 100 having an end portion provided with an outer chamfer 101. In this example, the end portion also has an inner chamfer 102, but that is not essential so far as the invention is concerned.

The coupling device may be of the union type, a T or Y coupling, a tapping, etc. Both ends of the device may be connected to respective tubes, or else one end may be connected to a tube and the other end to a circuit element such as a pump, an actuator, a valve, etc.

Figure 1:
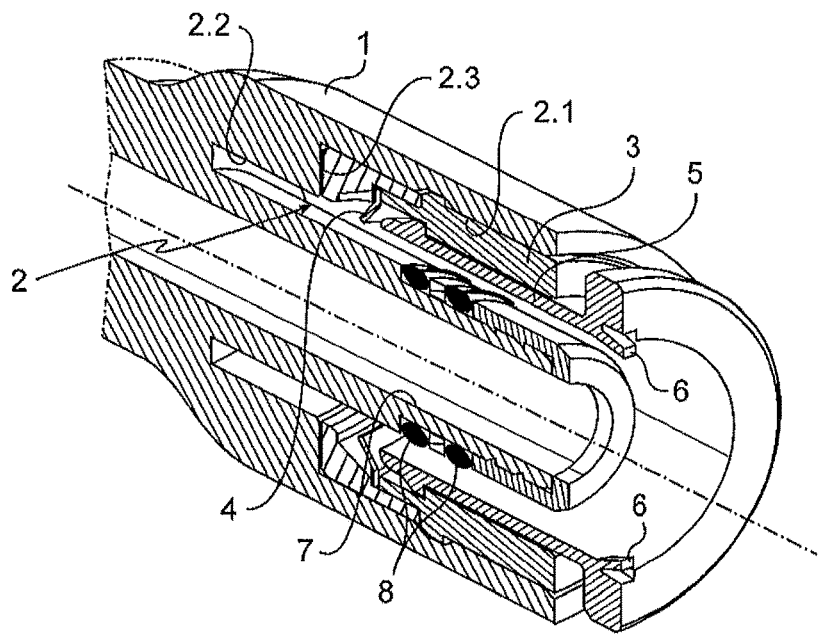
FIG. 1 is a perspective view in axial section of a coupling device in a first embodiment.

With reference to FIGS. 1 and 2, the coupling device in the first embodiment comprises a tubular body 1 having a stepped housing formed therein given overall reference 2 and comprising an inlet segment 2.1 and a terminal segment 2.2 that is connected to the inlet segment 2.1 via a shoulder 2.3. A two-part tubular insert 3 is fastened inside the inlet segment 2.1 and serves to hold captive an attachment washer 4 for attaching the tube end portion and for receiving a slidable pusher 5.

The terminal segment 2.2 is arranged to receive the terminal segment of the tube end portion 100.

The washer 4 is an elastically deformable washer having an internal outline subdivided into a plurality of teeth and having a rest state in which the teeth define a through section that is smaller than the outside section of the tube end portion 100, and a deformed state in which the through section defined by the teeth is equal to or greater than the outside section of the tube end portion 100.

The pusher 5 is tubular and defines a through section for the tube end portion 100. The pusher 5 is movable between a first position in which it allows the washer 4 to retain the tube end portion 100, and a second position in which it prevents the washer 4 from retaining the tube end portion 100. Remote from the washer 4, the pusher 5 has a first end projecting from the body 1 and enabling the pusher 5 to be moved from its first position towards its second position, and beside the washer 4 it has a second end arranged to lift the teeth of the washer 4 when the pusher 5 is in its second position.

The device has two retractable abutments 6 that are arranged so as to oppose insertion into the body 1 of a tube end portion that is not chamfered, and so that the outer chamfer 101 forms a cam for causing the abutments 6 to retract when the chamfered tube end portion 100 is inserted in the body 1. The abutments 6 are secured to the first end of the pusher 5 remote from the washer 4. More precisely, the abutments 6 are in the form of tongues made in the inside wall at the first end of the pusher 5 so as to extend substantially axially, having a downstream end secured to the pusher 5 and an upstream that is free and that projects inwards into the through section defined by the pusher 5 ("downstream" and "upstream" refer to the direction in which the tube end portion is inserted into the device).

The body 1 has a central tubular appendix 7 extending coaxially and projecting axially into the stepped housing 2, onto which the tube end portion 100 is to be engaged. Two sealing elements are mounted on said central tubular appendix 7 so as to be compressed between an outer surface of the central tubular appendix 7 and an inside surface of the tube end portion 100.

In order to couple a tube to the coupling device, it is necessary:
to cut the tube to length;
to shape the end portion of the cut tube 100 so as to give it a circular section, where necessary, and so as to form thereon at least one outer chamfer 101; and
to insert the tube end portion 100 into the coupling device.

Figure 2A:
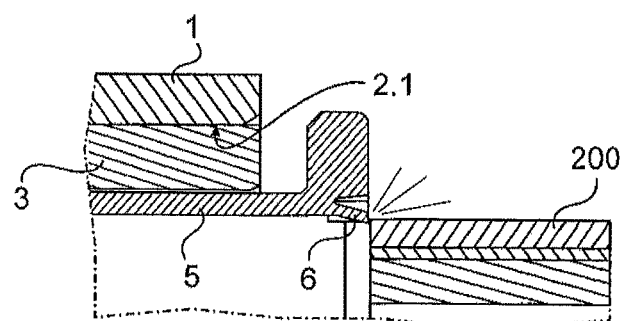
FIGS. 2a, 2b, and 2c are fragmentary longitudinal section views showing respectively an attempt at coupling a tube end portion that is not chamfered, the beginning of inserting a tube end portion that is chamfered, and continued insertion of a chamfered tube end portion.
Figure 2B:
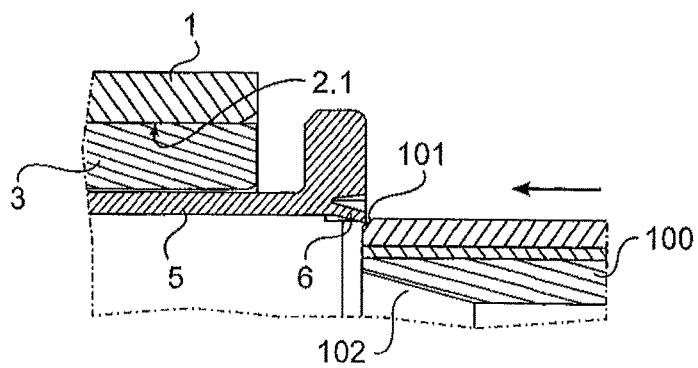
Figure 2C:
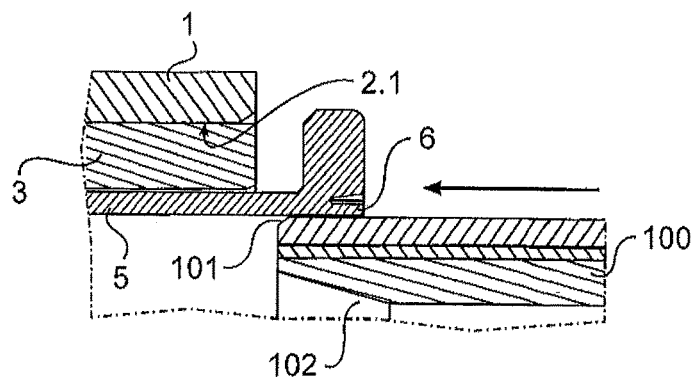

In FIGS. 2b and 2c, it can be seen that the outer chamfer 101 forms a cam for retracting the abutments 6 when the chamfered tube end portion 100 is inserted into the body 1.

Conversely, in FIG. 2a, it can be seen that a tube end portion 200 that does not have an outer chamfer comes into abutment against the abutments 6 without being able to cause them to retract.

Figure 3:
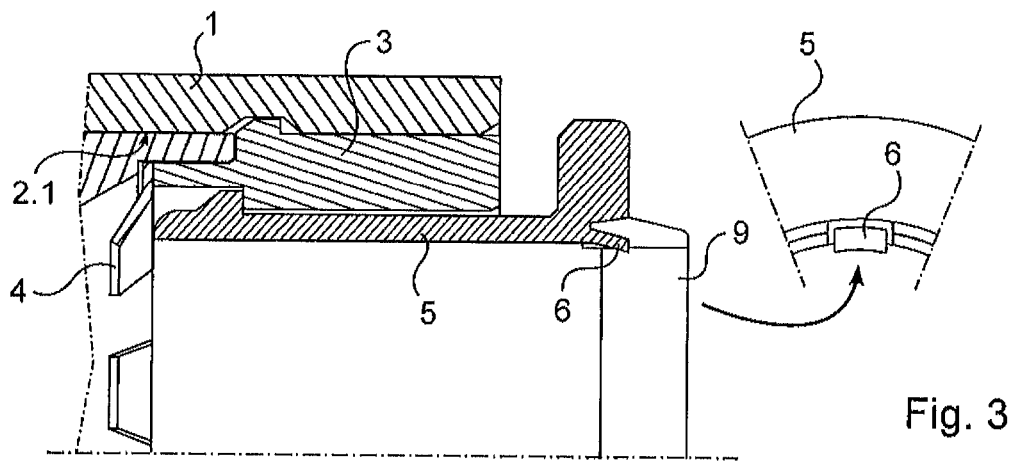
FIG. 3 is a fragmentary longitudinal section view of a coupling device in a first variant of the first embodiment.

In the first variant of FIG. 3, the abutments 6 are set back axially from an additional annular surface 9 for guiding the tube end portion 100, said additional annular guide surface 9 extending axially upstream from the abutments 6 relative to the direction the tube end portion 100 is inserted into the device.

Figure 4:
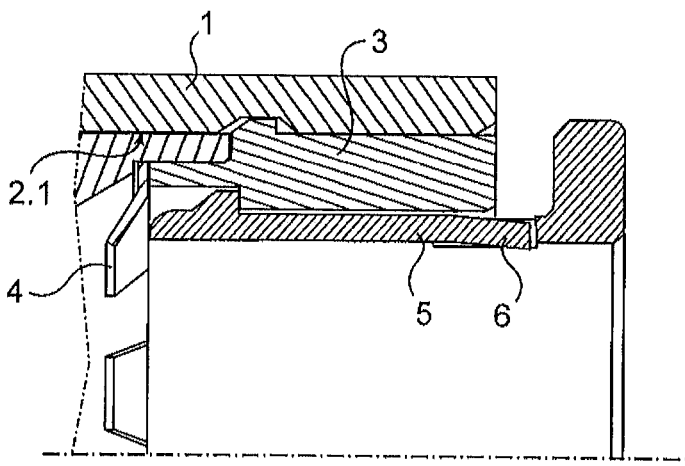
FIG. 4 is a fragmentary longitudinal section view of a coupling device in a second variant of the first embodiment.

In the second variant of FIG. 4, the abutments 6 are no longer secured to the first end of the pusher 5, but to a central portion of the pusher 5. The abutments 6 are in the form of axial tabs defined in the wall of the pusher 5. In this example, the abutments 6 are of substantially the same thickness as the tubular wall of the pusher 5 in which the abutments 6 are defined, and they have their free ends beside the first end of the pusher 5. The free end of each abutment 6 projects into the inside of the pusher 5 and presents a radial surface facing the inlet of the pusher 5.

Thus, the outer chamfer 101 of a tube end 100 forms a cam for retracting the abutments 6 when the chamfered tube end portion 100 is inserted into the body 1. Conversely, a tube end portion 200 that does not have an outer chamfer comes into abutment against the radial surfaces of the free ends of the abutments 6 without being able to retract them.

The inside surface of the portion of the pusher 5 that extends between the first end of the pusher 5 and the free ends of the abutments 6 forms a guide surface for guiding the tube end portion 100 before it meets the abutments 6.

Figure 9:
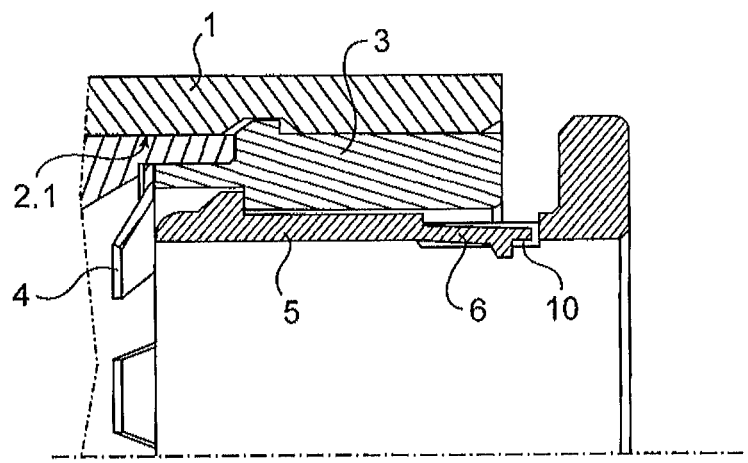
FIG. 9 is a view analogous to FIG. 4 showing an improvement of the second variant of the first embodiment.
Figure 10A:
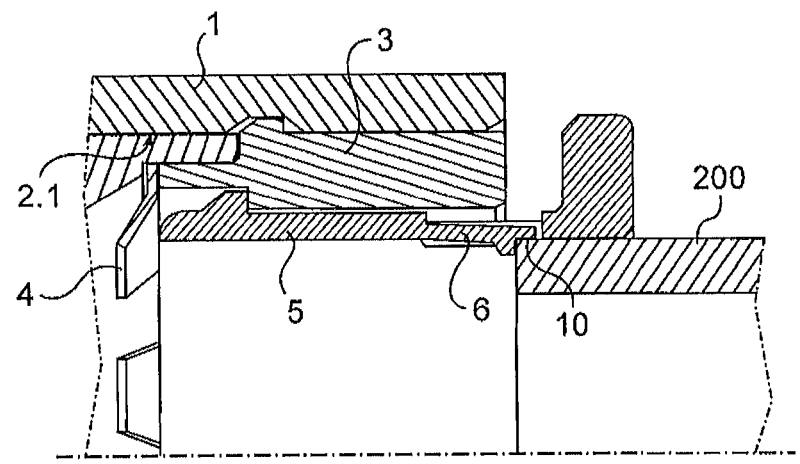
FIGS. 10a and 10b are views analogous to FIGS. 2a and 2c showing this device.
Figure 10B:
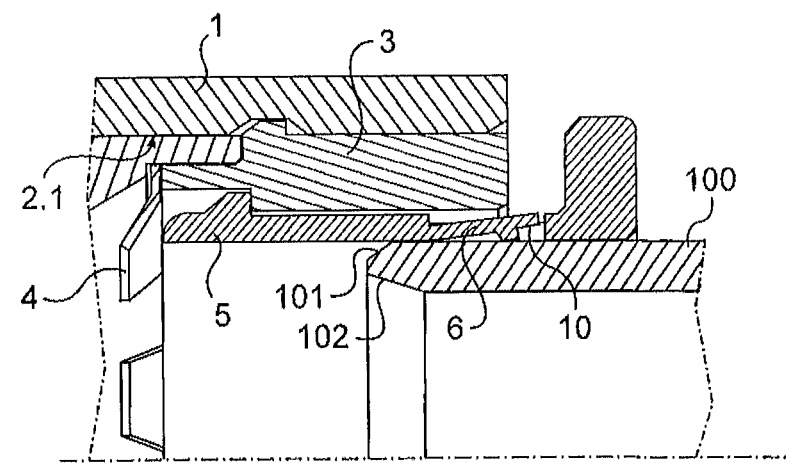

In the improvement of this variant that is shown in FIGS. 9, 10a, and 10b, the abutments 6 are of thickness that is smaller than the thickness of the tubular wall of the pusher 5 in which the abutments 6 are defined so as to impart greater flexibility to the abutments 6 and limit the force that is needed for inserting the tube in the pusher 5. When the device has a sealing element arranged in a housing of the body 1 so as to bear against an outside surface of the tube end portion 100 (e.g. such as the sealing element 61 in FIG. 6), the relatively great flexibility of the abutments 6 serves to limit any risk of the outside surface of the tube being damaged and thus any risk of poor contact with the sealing element.

Each abutment 6 is provided with a portion in relief 11 that projects towards the inside of the pusher 5. The portion in relief 11 presents a radial surface facing the inlet of the pusher 5 and extending at a distance from the free end. A bearing surface 10 extends axially between said radial surface and the free end of the abutment 6.

As before, the outer chamfer 101 of a tube end 100 forms a cam for retracting the abutments 6 when the chamfered tube end portion 100 is inserted into the body 1. Conversely, a tube end portion 200 that does not have an outer chamfer comes into abutment against the radial surfaces of the free ends of the abutments 6 without being able to retract them. The bearing surfaces 10 are pressed against the outside surface of the tube end portion 200 and prevent the abutments 6 from flexing under the insertion force of the tube 200.

The bearing surfaces 10 are particularly useful when the abutments 6 are very flexible.

Figure 5:
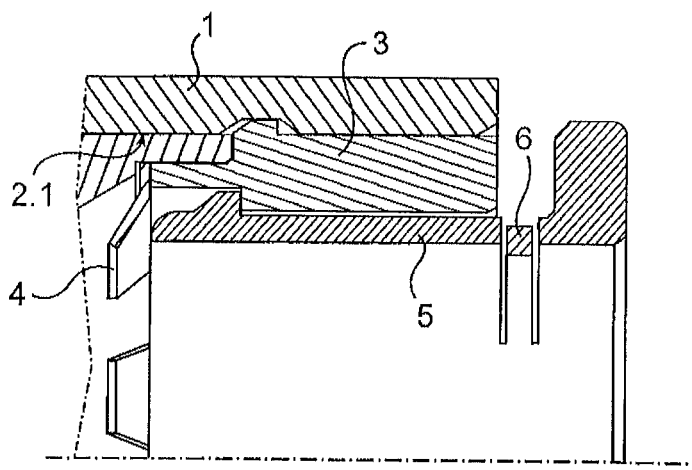
FIG. 5 is a fragmentary longitudinal section view of a coupling device in a third variant of the first embodiment.

In the third variant of FIG. 5, the abutments 6 no longer extend axially, but rather they extend circumferentially. More precisely, the abutments 6 are in the form of tongues formed in the inside wall of the central portion of the pusher 5 so as to extend substantially circumferentially relative to the pusher 5, each having one end secured to the pusher 5 and a free end that projects internally into the through section defined by the pusher 5. It can be understood that the tube end portion 100 no longer comes to bear against the terminal faces of the tongues, but rather against their upstream side faces (where "upstream" refers to the direction in which the tube end portion 100 is inserted into the device).

Figure 6:
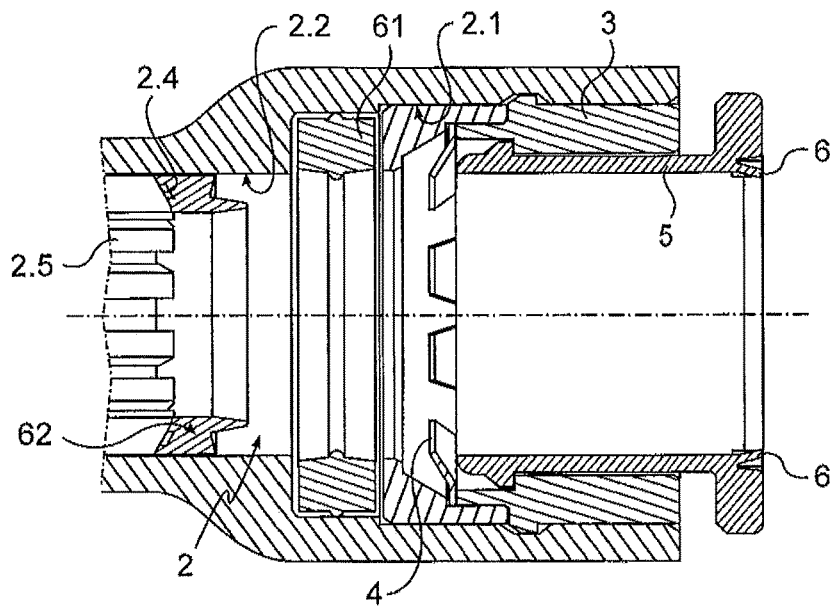
FIG. 6 is a fragmentary longitudinal section view of a coupling device in a second embodiment.
Figure 7:
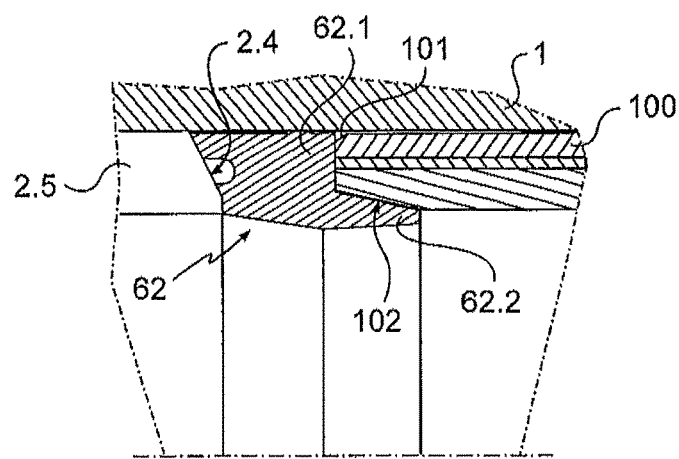
FIG. 7 is a fragmentary detail view in longitudinal section of the coupling device of the second embodiment after coupling a tube end portion.

With reference to FIGS. 6 and 7, and in the second embodiment, the body 1 does not have an appendix 7.

A first annular sealing element 61 is housed in the inlet segment 2.1 between the shoulder 2.3 and the insert 3. The first sealing element 61 is thus arranged to be compressed between an axial wall of the inlet segment 2.1 and an outside surface of the tube end portion 100.

A second annular sealing element given overall reference 62 is housed in the terminal segment 2.2 bearing against substantially radial walls 2.4 that extend downstream from the second annular sealing element 62 relative to the direction for inserting the tube end portion 100 into the device, and which are formed by the ends of splines 2.5 of the body 1 that extend axially in the terminal segment 2.2. The second sealing element 62 has an annular main portion 62.1 having an internal outline with a tubular sleeve 62.2 projecting axially therefrom, which sleeve is arranged to be pressed against an annular inside surface portion of the tube end portion 100, the internal chamfer 101 in this example, when the main portion of the sealing element is compressed between the substantially radial walls 2.4 and the front surface of the tube end portion 100. It should be observed that because of the spaces between the splines 2.5, fluid pressure can act behind the annular main portion 62.1 in order to press the annular main portion 62.1 even harder against the front surface of the tube end portion 100 and press the tubular sleeve 62.2 against the inner chamfer 102 (where the principle of such operation is described in particular in Document FR-A-2 941 027). Also preferably for this purpose, the radial walls 2.4 slope in such a manner that the compression force exerted by the front surface of the tube end portion 100 on the second sealing element 62 during insertion of the tube end portion 100 tends to press the tubular sleeve 62.2 against the inner chamfer 102.

It should be observed that the sealing element 61 is effective in performing a sealing function only in the event of the sealing element 62 failing. Such failure might result from omitting or damaging the sealing element 62, e.g. while it is being installed.

This embodiment is particularly advantageous since the minimum through section is only slightly smaller than the inside section of the tube.

Figure 8:
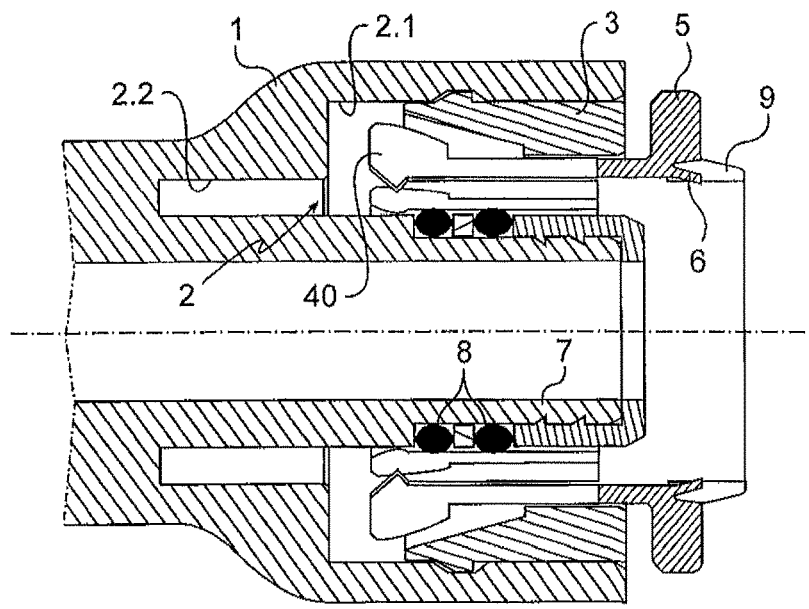
FIG. 8 is a view analogous to FIG. 6 showing a coupling device in a third embodiment.

With reference to FIG. 8, and in the third embodiment, the body of the device is substantially identical to that of the first embodiment, however instead of the washer 4, the device has a clamp-type attachment member 40 formed integrally with the pusher 5, the attachment member 40 forming the second end of the pusher 5. The pusher 5 is otherwise identical to that of FIG. 3.

It should be observed that the abutment is distinct from the active portion of the device used for attaching the tube (this active portion being either the teeth of the abutment washer or else the end portion of the clamp used for clamping the tube). The abutment can thus be arranged in the vicinity of the inlet of the device so that the operator can clearly see when the tube is not pushed far enough into the device for connection to be established.

Naturally, the invention is not limited to the embodiments described but covers any variant coming within the ambit of the invention and as defined in the claims.

In particular, the body of the device may be of a shape other than that described.

The number and the shape of the sealing elements may be modified.

The splines 2.5 may be replaced by a swelling having a channel formed therein to bring fluid behind the sealing element 62.

The device need not have a pusher.

The number, shape, and positions of the abutments may be modified.

The abutment may be integral with the body or with the insert in the absence of a pusher.

The invention claimed is:

1. A coupling device for a tube having an end portion provided with an outer chamfer, the device comprising a tubular body provided internally with an annular sealing element and with an attachment member for retaining the end portion of the tube in leak-tight manner in the body, wherein the device includes at least one retractable abutment arranged so as to oppose insertion into the body of a tube end portion that is not chamfered and so that the chamfer of the tube end portion that is chamfered forms a cam for causing the abutment to retract while the tube is being inserted into the body, the device including a tubular disconnection pusher that is coaxial with the annular sealing element, that defines a through section for the tube end portion, and that is movable between a first position in which it allows the attachment member to perform retention, and a second position in which it prevents the attachment member from performing retention, the pusher having a first end remote from the attachment member and arranged to be capable of moving the pusher from its first position to its second position, and the abutment being part of the pusher.

2. A device according to claim 1, wherein the attachment member and the pusher are a single piece, the attachment member forming a second end of the pusher.

3. A device according to claim 1, wherein the attachment member is a deformable washer having an inner outline subdivided into a plurality of teeth, the pusher having a second end arranged to lift the teeth when the pusher is in its second position.

4. A device according to claim 1, wherein the abutment is part of the first end of the pusher.

5. A device according to claim 1, wherein the abutments are defined in a wall of the pusher and extend axially relative to the pusher.

6. A device according to claim 5, wherein the abutments are of thickness substantially equal to the thickness of the wall of the pusher.

7. A device according to claim 5, wherein the abutments are of thickness that is smaller than the thickness of the wall of the pusher and include portions in relief projecting towards the inside of the pusher.

8. A device according to claim 7, wherein the portion in relief extends at a distance from the free end of the abutment such that between the portion in relief and the free end there extends a bearing surface for bearing against an outer surface of the non-chamfered tube end portion.

9. A device according to claim 1, wherein the sealing element is received in a housing of the body so as to be compressed between an axial wall of the housing and an outside surface of the tube end portion.

10. A device according to claim 1, wherein the abutment is set back axially from an additional annular guide surface for guiding the tube end portion, said additional annular guide surface extending upstream from the abutment relative to the direction for inserting the tube end portion in the device.

11. A device according to claim 1, wherein the sealing element is received in a housing of the body so as to be compressed between an axial wall of the housing and an outside surface of the tube end portion.

12. A device according to claim 1, wherein the sealing element is received in a housing of the body to be compressed between a radial wall of the housing and a front surface of the tube end portion.

13. A device according to claim 12, wherein the sealing element has an annular main portion with an internal outline projecting axially from which there extends a tubular sleeve arranged to be pressed against an annular internal surface portion of the end portion of the tube when the main portion of the sealing element is compressed between the radial wall of the housing and the front surface of the tube end portion.

14. A device according to claim 1, wherein the body includes a central tubular appendix onto which the tube end portion is to be engaged, the sealing element being mounted on said appendix to be compressed between an outside surface of the appendix and an inside surface of the tube end portion.

15. A device according to claim 1, wherein the abutment is set back axially from an additional annular guide surface for guiding the tube end portion, said additional annular guide surface extending upstream from the abutment relative to the direction for inserting the tube end portion in the device.

16. A coupling device for a tube having an end portion provided with an outer chamfer, the device comprising a tubular body provided internally with an annular sealing element and with an attachment member for retaining the end portion of the tube in leak-tight manner in the body, wherein the device includes at least one retractable abutment arranged so as to oppose insertion into the body of a tube end portion that is not chamfered and so that the chamfer of the tube end portion that is chamfered forms a cam for causing the abutment to retract while the tube is being inserted into the body, the abutment having a front face extending radially to abut against a front end of a tube end portion that is not chamfered, the sealing element being received in a housing of the body to be compressed between a radial wall of the housing and a front surface of the tube end portion.

17. A device according to claim 16, wherein the sealing element has an annular main portion with an internal outline projecting axially from which there extends a tubular sleeve arranged to be pressed against an annular internal surface portion of the end portion of the tube when the main portion of the sealing element is compressed between the radial wall of the housing and the front surface of the tube end portion.

18. A coupling device for a tube having an end portion provided with an outer chamfer, the device comprising a tubular body provided internally with an annular sealing element and with an attachment member for retaining the end portion of the tube in leak-tight manner in the body, wherein the device includes at least one retractable abutment arranged so as to oppose insertion into the body of a tube end portion that is not chamfered and so that the chamfer of the tube end portion that is chamfered forms a cam for causing the abutment to retract while the tube is being inserted into the body, the abutment having a front face extending radially to abut against a front end of a tube end portion that is not chamfered, the body including a central tubular appendix onto which the tube end portion is to be engaged, the sealing element being mounted on said appendix to be compressed between an outside surface of the appendix and an inside surface of the tube end portion.

* * * * *